United States Patent [19]

Umetsu

[11] 4,455,723
[45] Jun. 26, 1984

[54] REMOVABLE COUPLING DEVICE BETWEEN A PHOTOGRAPHIC CAMERA AND AN ACCESSORY

[75] Inventor: Junji Umetsu, Tokyo, Japan

[73] Assignee: Ashai Optical Co., Ltd., Tokyo, Japan

[21] Appl. No.: 276,470

[22] Filed: Jun. 23, 1981

[30] Foreign Application Priority Data

Sep. 11, 1980 [JP] Japan .............................. 55-129667[U]

[51] Int. Cl.³ ....................... F16B 21/09; A44B 21/00
[52] U.S. Cl. ........................................ 24/647; 403/353
[58] Field of Search ............ 24/211 M, 211 L, 211 R, 24/230 A; 403/353, 360, 361

[56] References Cited

U.S. PATENT DOCUMENTS

| | | | |
|---|---|---|---|
| 1,804,420 | 5/1931 | Kelley | 403/353 X |
| 2,446,018 | 7/1948 | Miskimen | 403/353 X |
| 2,556,839 | 6/1951 | Cretella | 403/353 X |
| 2,824,315 | 2/1958 | McKenny | 24/211 M X |

FOREIGN PATENT DOCUMENTS

| | | | |
|---|---|---|---|
| 2263955 | 7/1974 | Fed. Rep. of Germany | 24/230 A |
| 264700 | 1/1950 | Switzerland | 24/211 R |

*Primary Examiner*—Robert P. Swiatek

[57] ABSTRACT

In a removable coupling device between a photographic camera and an accessory of the type comprising at least two coupling pins secure to the camera and a coupling plate provided with key hole shaped opening to receive enlarged heads of the coupling pins and secured to the accessory, there are provided a sleeve bearing secured to the accessory, an operating shaft threaded into the sleeve bearing, a restoring spring for the operating shaft, an intermediate member threaded on the operating shaft and provided with a stop member, a locking frame pivotally supported by the intermediate member and provided with a member urged against one of the pins received in one of the key hole shaped openings when the operating shaft is rotated and an arm which when pushed by the operating shaft rotates the locking frame away from the pin and a spring for normally urge the locking frame against the coupling plate. Coupling members on the camera and the accessory can be interchanged.

2 Claims, 6 Drawing Figures

REMOVABLE COUPLING DEVICE BETWEEN A PHOTOGRAPHIC CAMERA AND AN ACCESSORY

BACKGROUND OF THE INVENTION

This invention relates to a coupling device for removably mounting an accessory on a photographic camera.

Although a coupling device including a pin with an enlarged head and a member having a key hole for receiving the pin has been used, some of these coupling devices are constructed such that the accessory is rotatable about the pin, that a back lash exists, and that the positional accuracy between the camera and the accessory is not high. For this reason, such coupling devices can be used only for such accessories as a strap or a grip that can ignore the disadvantages described above.

SUMMARY OF THE INVENTION

Accordingly, it is an object of this invention to provide an improved coupling device for removably mounting an accessary on the body of a photographic camera without difficulties described above.

Another object of this invention is to provide a novel coupling device capable of mounting the accessory on the camera at a high positional accuracy.

According to this invention there is provided a removable coupling device between a photographic camera and an accessory of the type comprising at least two coupling pins secured to either one of the camera and the accessory and a coupling plate provided with key hole shaped openings to receive the coupling pins and secured to the other of the camera and the accessory, the improvement comprising a sleeve bearing secured to either one of the camera and the accessory, an operating shaft threaded into the sleeve bearing, a restoring spring for the operating shaft, an intermediate member threaded onto the operating shaft and provided with a stop member, a locking member pivotally supported by the intermediate member and provided with a member urged against one of the pins received in one of key hole shaped openings when the operating shaft is rotated and an arm which when pushed by the operating shaft rotates the locking member away from the pin, and a spring for normally urge the locking member against the coupling plate.

BRIEF DESCRIPTION OF THE DRAWINGS

Further objects and advantages can be more fully understood from the following detailed description taken in conjunction with the accompanying drawings in which.

DESCRIPTION OF THE PREFERRED EMBODIMENT

Figure 1:
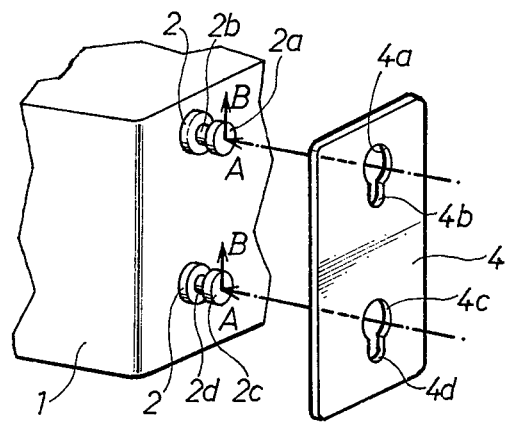
FIG. 1 is a perspective view showing essential elements of a coupling device between a camera and an accessory.

To have better understanding of the invention, a prior art coupling device will firstly be described with reference to FIG. 5. A pin 21 secured to the body of a photographic camera, not shown, comprises an enlarged head 21a and an engaging portion 21b for preventing axial disengagement of an accessory. A coupling member secured to the accessory is provided with a key hole shaped opening including an opening 22a having a diameter slightly larger than that of the enlarged head 21a and an opening 22b having a width slightly larger than that of the pin 21. The coupling member 22 has a rectangular opening 22c for attaching a strap 25. The coupling device also comprises a locking plate 23 made of a leaf spring with one end secured to the coupling member 22 with rivets 24 and the other end provided with an operating tab 23b. The locking plate 23 is provided with a square window 23a at a portion confronting the key hole.

The coupling device shown in FIG. 5 operates as follows. As the pin 21 is inserted into the opening 22a, the head 21a of the pin 21 would push upwardly the locking plate 23 to a position shown by dot and dash lines against the spring force of the locking plate 23. Then the pin 21 is slid in the longitudinal direction of the key hole thus causing the pin 21 to engage the opening 22b of the coupling member 22 and then enter into the window 23a of the locking member 23 as shown by solid lines, thereby completing the mounting operation. Dismounting of the accessory is accomplished by pulling the tab 23b outward relative to plate 22 and then pushing downwardly so that the pin 21 can be moved to opening 22a in the coupling member 22.

Although the coupling device described above can positively mount the accessory on the body of a camera, there is a large back lash and since the mounted accessory can rotate about the pin, this coupling device can be used only for such accessory as a strap.

Figure 5:
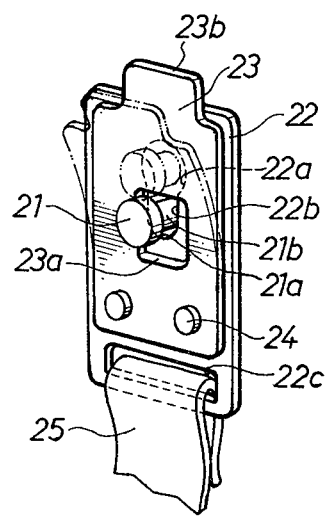
FIG. 5 is a perspective view showing a prior art coupling device.
Figure 6:
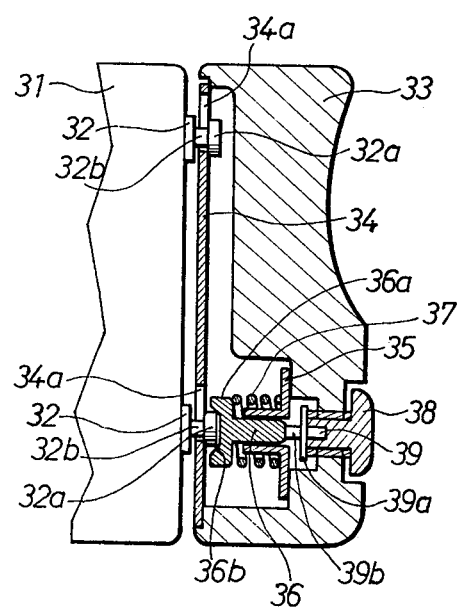
FIG. 6 is sectional view of another prior art coupling device.

FIG. 6 shows another example of the prior art coupling device in which two coupling pins 32 secured to a camera body 31 have enlarged heads 32a and engaging portions 32b like the pin 21 shown in FIG. 5. Similar to the coupling member 22 shown in FIG. 5, a coupling plate 34 secured to an accessory 33 with screws or the like, not shown, is formed with key openings 34a for removably receiving the pins 32. A sleeve bearing 35 is secured to the accessory 33 with screws or the like, not shown, for slidably receiving a locking pin 36 which is urged by a spring 37 surrounding the sleeve bearing to normally press the dish shaped head 36a of the locking pin 36 against a coupling plate 34. The dish shaped head 36a has an inclined surface 36a. An operating member 38 coaxial with the locking pin 36 is threaded into the accessory 33. A push pin threaded to the inner end of the operating member 38 is provided with a flange 39a which prevents the push pin 39 from disengaging from the accessory 33 and a projection 39b which pushes the locking pin 36 to the left as viewed in FIG. 6 when the operating member 38 is rotated. When the accessory 33 is mounted on the camera 31 the locking pin 36 comes into axial alignment with the lower coupling pin 32.

The accessory 33 is mounted on the body of the camera in the following manner. More particularly, after rotating the operating member 38 until the flange 39a of the push pin 39 comes to engage the accessory, the coupling pins 32 are inserted into key openings 34a of the coupling plate 34. Then the head 32a of the lower pin 32 engages the head 36a of the locking pin 36 to push the same to the right against the force of the spring 37. Then, the head 32a of the lower pin 32 will engage the inclined surface 36b of the head 36a of the pin 36. Thereafter, the operating member 38 is rotated in a direction to strongly urge the locking pin 36 against the pin 32 thus completing the mounting operation of the accessory on the camera.

To dismount the accessory, the operating member 38 is rotated in the opposite direction until the flange 39a of the push pin 39 engages the accessory 33. Then the pins 32 can slide in the upward direction in the key openings 34a against the force of the biasing spring 37.

The coupling device shown in FIG. 6 does not rotate about the pins 32 and is free from any back lash so that firm coupling can be ensured. However, since the positional accuracy of the accessory with respect to the camera body is determined by the relative position between the lower pin 32 and the locking pin 36, the positional accuracy is lower than that of the coupling device according to this invention to be described later. When a shock or vibration is applied under a state in which the head 32a of the lower pin 32 is received in the inclined surface 36b of the locking pin 36 the coupling would be inadvertently disengaged. Where the coupling device shown in FIG. 6 is used to mount a simple grip on the body of the camera it is relatively easy to construct the coupling device such that the locking pin 36 would be coaxial with the lower pin, but depending upon the type of the accessory there is a limit on the space and function of the accessory.

A preferred embodiment of this invention will now be described with reference to FIGS. 1 to 4.

As shown two coupling pins 2 are secured to the body 1 of a camera with screws or the like. These coupling pins 2 are used to mount an accessory 3 and provided with enlarged heads 2a, 2c and engaging portion 2b, 2d. A coupling plate 4 (FIGS. 3 and 4) is secured to the accessory 3 with screws, not shown. The coupling plate 4 is provided with key hole shaped openings 4b, 4d and engaging openings 4a, 4c for receiving the enlarged heads 2a of the coupling pins 2. Each opening 4a has a narrow opening 4b for receiving the pin 2 to precisely mount the accessory.

Figure 2:
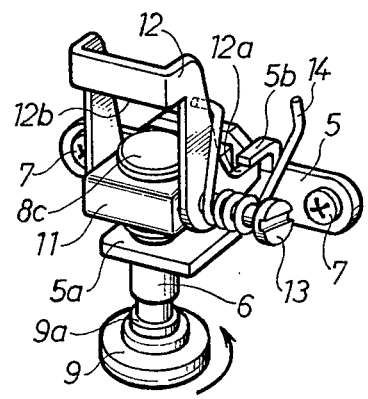
FIG. 2 is a perspective view showing coupling element attached to an accessory.
Figure 3:
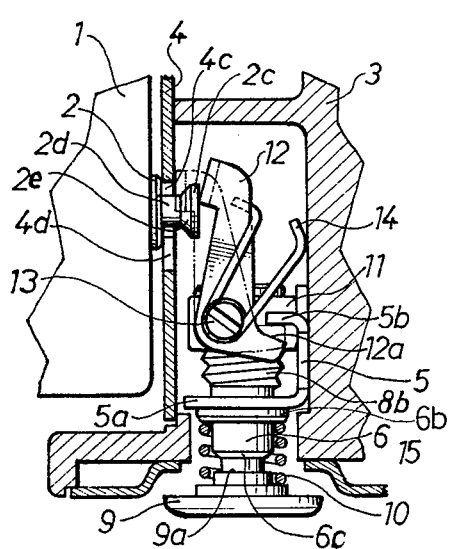
FIG. 3 is sectional view showing a manner of mounting the accessory.
Figure 4:
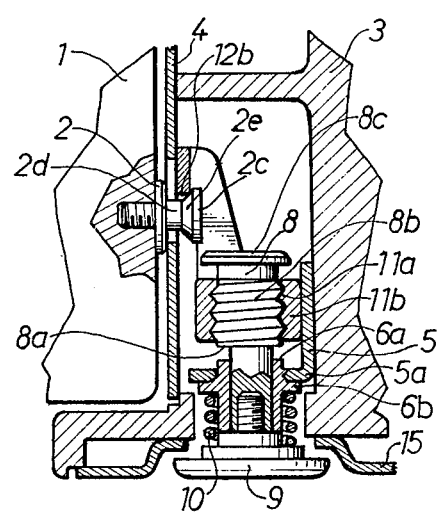
FIG. 4 is a sectional view showing the locked state.

The coupling device embodying the invention and secured to the accessory 3 to cooperate with the lower coupling pin head 2c shown in FIG. 2 will now be described with reference to FIGS. 2, 3 and 4. A vertical sleeve bearing 6 is suitably secured to a supporting plate 5 which is secured to one side of the accessory 3 switch screws 7. To the lower end of a drive shaft 8 fitted in the sleeve bearing 6 to be slidable in the axial direction and rotate is secured an operating member 9 by a screw or the like and a restoring spring 10 is interposed between the upper flange 6b of the bearing and the upper surface of the operating member 9 for normally urging a shoulder 8a of the driving shaft 8 against the upper end 6a of the bearing 6. Accordingly, when the operating member 9 is pushed upwardly against the force of the restoring spring 10 the operating member 9 is raised until its upper shoulder 9a engages the lower end 6c of the bearing 6. An intermediate member 11 is threaded on the driving shaft 8 through screw threads 11a and 8b. The intermediate member 11 is prevented from rotating by the engagement of a rotation preventing member 11b and the supporting plate 5 so that the intermediate member 11 can slide in the axial direction of the driving shaft 8 when the operating member 9 and the driving shaft 8 are rotated over a distance between a point at which the intermediate member 11 engages the flange 8c of the driving shaft 8 and a point at which the intermediate member 11 engages the horizontal portion 5a of the supporting plate 5. A locking frame 12 is pivotally supported by a pair of opposing pins 13 secured to the intermediate member 11 by screws or the like and biased to rotate in the counterclockwise direction as viewed in FIG. 3 by a spring 14 so as to normally engage the coupling member 4. When the drive shaft 8 is pushed upwardly while its flange 8c is engaged with the upper end of the intermediate member 11, the lower arm 12a of the locking frame 12 engages an inwardly bent stop member 5b of the supporting plate 5 thus rotating the locking frame 12 in the clockwise direction as viewed in FIG. 3 against the force of the spring 14. A connecting member 12b of the locking frame 12 confronts an opening 4c of the coupling plate 4 so that the member 12b engages the head 2c of the coupling pin 2. An ornamental plate 15 surrounding the operating member 9 is secured to the bottom of the accessory 3 by screws, not shown.

The operation of the coupling device according to this invention will be described with reference to FIGS. 1, 3 and 4.

A method of mounting the accessory 3 on the camera body 1 will firstly be described. The operating member 9 is rotated in the counterclockwise direction until the intermediate member 11 engages the upper flange 8c of the driving shaft 8. Then the heads 2a, 2c of the coupling pins 2 are aligned with the openings 4a, 4c of the coupling plate 4 and the accessory 3 is brought toward the camera body 1 in the direction of arrows A. At this time, the head 2c of the coupling pin 2 rotates the locking frame 12 in the clockwise direction as viewed in FIG. 3 against the force of spring 14. Then the accessory 3 is pushed upwardly in the direction of arrows B to cause the pins 2 to enter into the openings 4b, 4d of the coupling plate 4 and to disengage the head 2c of the lower pin 2 from the locking frame 12 whereby the locking frame 12 is rotated in the counterclockwise direction to engage again the coupling member 4 by the action of the spring 14. At this time, although there is a small back lash or clearance between the camera body and the accessory, it is impossible to remove the accessory. In other words, the accessory is held in a semi or partially locked state. Then, when the operating member 9 is rotated in the counterclockwise direction as viewed in FIG. 2, the locking frame 12 is moved downwardly so that the lower pin 2 shown in FIG. 1 is received in the opening 4d to bring the camera and accessory into correct relative position and to engage the shoulder 9a of the operating member 9 with the flange 6c of the bearing 6 as shown in FIG. 4. Furthermore, the connecting member 12b of the locking frame 12 strongly engages with the tapered back portion 2e of the pin head 2c thus positively locking the coupling between the camera and the accessory.

The accessory is dismounted as follows. Thus, the operating member 9 is rotated in the clockwise direction as viewed in FIG. 2 to loose the coupling to the semi locking state. Thereafter, the operating member 9 is pushed upwardly against the force of the restoring spring 10 until the shoulder 9a engages the flange 6c of the bearing 6 so that the lower arm 12 of the locking frame 12a engages the stop member 5b of the supporting plate 5. Accordingly, the locking frame 12 rotates in the clockwise direction against the force of the spring 14 to separate the connecting portion 12b of the locking frame 12 away from the coupling plate 4. Then, the accessory 3 is moved downwardly and then pulled to the right to completely dismount the accessory.

It should be understood that, more than two coupling pins may be used and that the elements of the coupling device may be interchanged between the camera body and the accessory. Further, the tapered back 2e may be omitted so long as the connecting portion 12b positively engages the pin 2 or its head 2c.

As above described, with the coupling device according to this invention, by merely moving the accessory toward the camera body in the direction of arrow A then slightly moving upwardly the accessory in the direction of arrow B, the accessory is coupled in a semi-locking state at which inadvertent dropping off can be prevented. Then the operating member 9 is rotated to firmly hold the accessory in the strongly locked position.

What is claimed is:

1. In a removable coupling device between a photographic camera and an accessory of the type comprising at least two coupling pins secured to either one of said camera and said accessory and a coupling plate provided with key hole shaped openings to receive said coupling pins and secured to the other of said camera and said accessory, the improvement comprising a sleeve bearing secured to either one of said camera and said accessory, an operating shaft fitted in said sleeve bearing, a restoring spring for said operating shaft, an intermediate member threaded on said operating shaft and provided with a rotation preventing member, a locking member pivotally supported by said intermediate member and provided with a member urged against one of said pins received in one of said key hole shaped openings when said operating shaft is rotated and an arm which when pushed by said operating shaft rotates said locking member away from said pin, and a spring for normally urge said locking member aginst said coupling plate.

2. The coupling device according to claim 1 wherein said coupling pin engaged by said locking member is provided with an enlarged head with an inclined back surface.

* * * * *